United States Patent
Dronzek, Jr.

(10) Patent No.: US 6,667,086 B2
(45) Date of Patent: Dec. 23, 2003

(54) DURABLE SUPPORTS FOR LABELING AND RELABELING OBJECTS

(75) Inventor: Peter J. Dronzek, Jr., Thornwood, NY (US)

(73) Assignee: Polymeric Converting LLC, Enfield, CT (US)

( * ) Notice: Subject to any disclaimer, the term of this patent is extended or adjusted under 35 U.S.C. 154(b) by 0 days.

(21) Appl. No.: 09/938,343

(22) Filed: Aug. 24, 2001

(65) Prior Publication Data
US 2003/0039785 A1 Feb. 27, 2003

(51) Int. Cl.$^7$ ................................................ B32B 7/12
(52) U.S. Cl. .................... 428/40.1; 40/594; 40/657; 40/661.09; 156/297; 428/40.7; 428/41.7; 428/41.8; 428/42.1; 428/352; 428/421; 428/422; 428/906
(58) Field of Search .................... 428/40.1, 40.7, 428/41.7, 41.8, 42.1, 352, 421, 422, 906; 156/297; 40/594, 657, 661.09

(56) References Cited

U.S. PATENT DOCUMENTS

| | | | |
|---|---|---|---|
| 4,767,654 A | 8/1988 | Riggsbee | 428/40 |
| 4,886,680 A | * 12/1989 | Tindall | 427/208.4 |
| 5,543,191 A | 8/1996 | Dronzek, Jr. et al. | 428/41 |
| 5,628,858 A | 5/1997 | Petrou | 156/249 |

* cited by examiner

Primary Examiner—Nasser Ahmad
(74) Attorney, Agent, or Firm—Hedman & Costigan, P.C.

(57) ABSTRACT

Durable self-adhesive laminates for use as supports for labeling comprising:

(a) a thermoplastic resin film having (A) a label-receiving side and (B) an adhesive side, the label-receiving side consisting of a controlled-release surface without making use of a coated release substance and adapted to support a removable label attachable thereto by means comprising attraction forces between the resin film and a label; and (b) an adhesive having an ultimate release energy level greater than the attraction forces between the resin film and a removable label or labels.

14 Claims, 5 Drawing Sheets

DURABLE SUPPORTS FOR LABELING AND RELABELING OBJECTS

FIELD OF THE INVENTION

This invention relates to supports used in labeling and relabeling objects such as containers, and, more particularly, to supports which provide a durable, reusable surface for pressure-sensitive adhesive labels.

BACKGROUND OF THE INVENTION

In the production and merchandising of goods, it is often desirable to make use of removable coupons or labels contained on containers or packages that function as redeemable retail coupons, inventory control labels, and the like. In these functions, it is desirable and often necessary that the coupon label not be prone to premature detachment during shipping and handling, yet be readily and cleanly removable.

Furthermore, inventory control labels, especially those affixed to reusable containers, are subject to abrasion during shipping and handling and to chemical attack by spillage of the container contents. Abrasion and chemical attack can destroy important information and result in premature detachment of the label and, in the case of relabeling, can increase the difficulty in removability of the label.

U.S. Pat. No. 4,767,654, to Riggsbee "DETACHABLE COUPON LABEL", describes a label structure appropriate for attaching to packages or containers which permits the coupon label to be readily detached without leaving a tacky residue and without the use of a coated release substance. Specifically, Riggsbee requires the use of London or dispersion forces to attach the coupon at a desirable release force, in the range of 10–100 g/inch width, to a base sheet without making use of either an adhesive or a coated release substance. To accomplish his objectives, Riggsbee requires that the coupon layer be the substrate for "casting" a thin extruded film of resin so as to retain detachability without damage to the substrate and without leaving a tacky residue.

U.S. Pat. No. 5,628,858, to Petrou "LABEL SYSTEM FOR REUSABLE CONTAINERS AND THE LIKE", requires the use of a multilayer laminate called a "placard" having a coated release substance on one side and means on the other side for adhesively securing the placard to the container. The placard is partially transparent with instructional printing applied to one surface. Pressure-sensitive labels are placed on the exposed release-coated surface of the placard. The labels contain indicia relating to the status of the container. When the status of the container changes, the label is removed and a new label is substituted on the placard. As a preferred embodiment, the placard is provided on one face with a coated silicone release substance.

U.S. Pat. No. 5,543,191, to Dronzek, Jr. et al "DURABLE SHEETS FOR PRINTING", teaches that composite pressure sensitive label sheets will print in hot laser printers without curling if they comprise at least three layers: A. at least one base layer having a pressure sensitive adhesive on the bottom face, B. a printable surface layer on top of the base layer or layers, and C. a strippable protective backing on the pressure sensitive adhesive coated bottom face on the base layer or layers and if the thermal expansion or contraction characteristics of the printable layer B and the protective backing C are the same or substantially the same. In preferred embodiments, the backing C or layer A will be adhered to the pressure sensitive adhesive through a release coating, such as a poly(tetrafluoroethylene film) or more preferably a silicone resin, for the labels.

To summarize, in the present state of the art, it is known to use a laminated support structure ("placard") having a release-coated surface on one side and a pressure sensitive adhesive on the other backed by a removable release liner for attachment to a pressure sensitive coating of a label (Petrou). It is also known that one way to eliminate the use of a release coating on a support structure is to bond a thermoplastic film to a label by heat and pressure and, as well, not to use an adhesive (Riggsbee). Finally, it is known, but not preferable, to substitute a poly(tetrafluoroethylene) film for a silicone coating to release a support structure when the release liner is disposed of after only one use (Dronzek, Jr. et al).

It has now been found that durability of the multi-use label support structure will be vastly increased and reliability of the labeling and, especially, the re-labeling process will be enhanced by providing and using as a support structure a resin film having a controlled release surface made without using a coated release substance. "Durability" is increased, without limitation, in terms of ultraviolet (UV)-light resistance, abrasion resistance, anti-corrosives resistance, sterile packaging conditions resistance, chemical resistance, and the like. "Reliability" is enhanced by avoiding the use of a coated release substance, such as a silicone release coating, which, once abraded through the coating, causes the pressure sensitive adhesive-backed label or labels to stick and possibly even tear by contact with the underlying surface, and/or to distort or lose valuable printed information. Re-labeling is significantly improved because the substrate lends itself to use over and over again. Additionally, many temporary labels are removed and reapplied to other containers or areas for control and tracking purposes at various steps of manufacturing, packaging, storage and distribution, so the improved removability of the labels provided by the present invention is advantageous.

Accordingly, an object of the invention is to provide a durable support structure for use in labeling and relabeling using pressure-sensitive adhesive-backed labels.

Another object is to provide a durable support structure for use in labeling and relabeling using an adhesive-backed laminate having a disposable liner covering the adhesive.

These and other objects of the invention will become apparent from the present specification.

BRIEF DESCRIPTION OF THE DRAWINGS

In the drawings.

The invention is illustrated in the accompanying drawings in which.

SUMMARY OF THE INVENTION

According to this invention, there are provided durable self-adhesive laminates in roll, sheet or fan-fold form for use as support structures for labeling and re-labeling of objects such as containers and the like, the laminates comprising:
  (a) a thermoplastic resin film having (A) a label-receiving side and (B) an adhesive side, the label-receiving side consisting of a controlled-release surface without making use of a coated release substance and adapted to support a removable label attachable thereto by means comprising attraction forces between the resin film and the label;
  (b) an adhesive having an ultimate release energy level greater than the attraction forces between the resin film and a removable label or labels, the adhesive being situated on the adhesive side of the resin film; and,
  (c) optionally, a temporary backing in contact with the adhesive, the backing being adapted subsequently to be stripped from contact with the adhesive,
whereby the supports are suitable for mounting on an object to be labeled or re-labeled, after first having stripped any optional temporary backing therefrom, and any label or labels may, at the option of the user, be affixed to the label-receiving side and later separated from the resin film at a release force that effectuates such separation, without, at the same time, stripping the resin film from the object to be labeled or re-labeled.

Also contemplated as preferred embodiments of the present invention are laminates as defined above wherein:
(i) the removable label or labels comprise pressure-sensitive adhesive-backed label or labels;
(ii) the release force between the removable label or labels and the resin film having the controlled-release surface without making use of a release substance is about 5 to about 100 grams per inch width, and the adhesion energy level of the adhesive is greater than the release force between the label or labels and the resin film having the controlled-release surface without making use of a coated release substance; and especially those wherein the release force between the label or labels and the resin film having the controlled-release surface without making use of a coated release substance is about 20 to about 60 grams per inch width;
(iii) the label or labels comprise paper or a polymer film; especially those wherein the polymer is selected from polyethylene, polypropylene, poly(vinyl chloride), polyester, polyurethane, polyacrylate, polycarbonate, polyamide, polystyrene, fluoropolymer or a blend comprising any of the foregoing;
(iv) the resin film (a) comprises (polytetrafluoroethylene); and, special mention is made of those wherein:
  (v) the resin film (a) is a composite of paper and resin layers, the composite having (A) a label-receiving side comprising poly(tetrafluoroethylene) and (B) an adhesive side, the resins comprising polyethylene, polypropylene, poly(vinyl chloride), polyester, polyurethane, polyacrylate, polycarbonate, polyamide, polystyrene, fluoropolymer or a blend comprising any of the foregoing. The resin film (a) can consist solely of poly(tetrafluoroethylene) in preferred embodiments, but for low cost purposes since this fluoropolymer is relatively expensive, it is a preferred option to build a composite with a lower cost layer, such as paper. In any case, however the fluoropolymer should be greater than about 0.0005 inch thick.

In another major aspect, the present invention contemplates a process for the preparation of a durable self-adhesive laminate in roll, sheet or fan-fold form for use as a support for labeling and re-labeling of objects such as containers and the like, the process comprising:

(1) providing a thermoplastic resin film having (A) a label-receiving side and (B) an adhesive side, the label-receiving side consisting of a controlled-release surface without making use of a coated release substance and adapted to support a removable label attachable thereto by means comprising attraction forces between the resin film and the label;
(2) locating on the adhesive side of the resin film an adhesive having an ultimate release energy level greater than the attraction forces between the resin film and a removable label or labels; and
(3) optionally, providing a temporary backing in contact with the adhesive, the backing being adapted subsequently to be stripped from contact with the adhesive, thereby providing a support suitable for mounting on an object to be labeled or re-labeled, after first stripping any optional temporary backing therefrom, and affixing any label or labels, at the option of the user, to the label-receiving side and later separating from the resin film at a release force effecting such separation, without, at the same time, stripping the resin film from the object to be labeled or re-labeled.

Special mention is made of preferred embodiments of the process or the invention wherein:
(i) the removable label or labels comprise a pressure-sensitive adhesive-backed label or labels;
(ii) the release force between the casting substrate and the resin film having the controlled-release surface without making use of a coated release substance is about 5 to about 100 grams per inch width, and the adhesion energy level of the adhesive is greater than the release force between the label or labels and the resin film having the controlled-release surface without making use of a coated release substance; especially those wherein the release force between the label or labels and the resin film having the controlled-release surface without making use of a coated release substance is about 20 to about 60 grams per inch width;
(iii) the label or labels comprise paper or a polymer film; especially those wherein the polymer is selected from polyethylene, polypropylene, poly(vinyl chloride), polyester, polyurethane, polyacrylate, polycarbonate, polyamide, polystyrene, fluoropolymer or a blend comprising any of the foregoing;
(iv) the resin film (a) comprises (polytetrafluoroethylene); and special mention is made of support structures wherein:
  (v) the resin film (a) is a composite of paper and resin layers, the composite having (A) a label-receiving side comprising poly(tetrafluoroethylene) and (B) an adhesive side comprising polyethylene, polypropylene, poly(vinyl chloride), polyester, polyurethane, polyacrylate, polycarbonate, polyamide, polystyrene, fluoropolymer or a blend comprising any of the foregoing.

In another of its major aspects, the present invention contemplates a method of labeling or relabeling an object comprising:
a) providing a laminated support structure for pressure-sensitive adhesive-backed labels, the support structure comprising a thermoplastic resin film having (A) a label-receiving side and (B) an adhesive side, the label-receiving side consisting of a controlled-release surface without making use of a coated release substance and adapted to support a removable label attachable thereto by means comprising attraction forces between the resin film and the label substrate having a release coated face and an adhesive coated face, and a liner covering the adhesive coating;

b) removing the liner from the adhesive coated face;
c) substantially permanently attaching the support structure to the object by adhering the laminated support structure to the object using the adhesive coated face; and
d) placing a pressure-sensitive adhesive coated label on the label-receiving side consisting of the controlled-release surface without making use of a coated release substance of the support structure.

Preferred embodiments of this aspect include a method as defined, including the step comprising:

e) removing the label from the support structure while leaving the support structure adhered to the object; a method as defined, including the step comprising
f) replacing the label with another adhesive coated label having different indicia printed thereon by adhering the adhesive coating of the another label to the label-receiving side consisting of the controlled-release surface without making use of a coated release substance of the support structure.

Special mention is made of such methods wherein the object is a product container.

DETAILED DESCRIPTION OF THE INVENTION

Figure 1:
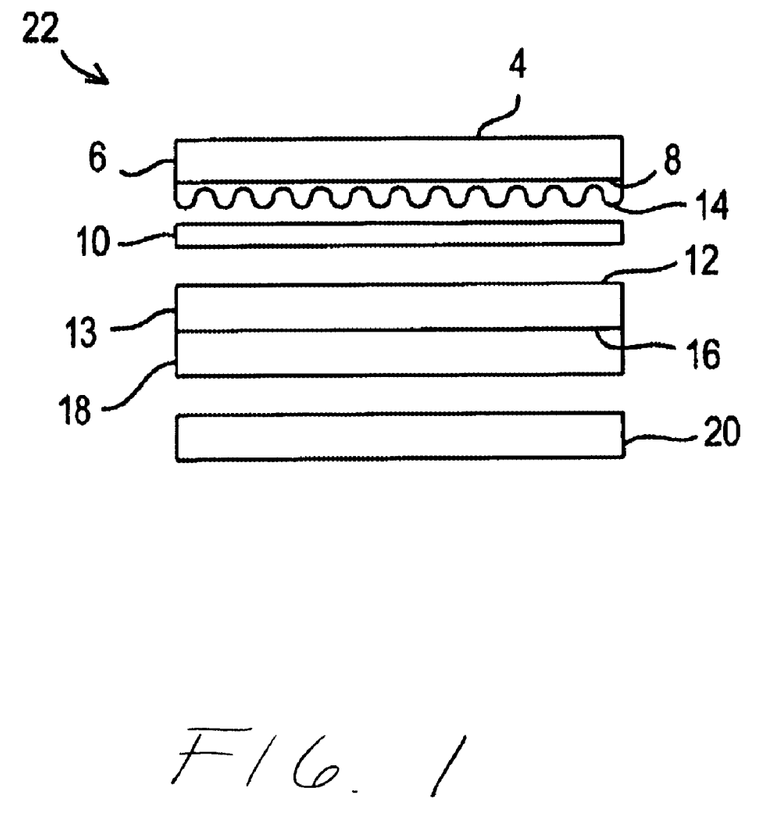
FIG. 1 is a block diagram view, partially exploded, of a first support structure constructed in accordance with the present invention.

Referring to FIG. 1, a support structure of this invention comprising a multi-layer laminate 2 is shown. The laminate 2 includes a support structure comprising, as essential elements 4, 6, 16 and 18, which are, reading from the top down: release face 4, made without the use of a coating of release substance, comprising resin film 6, for example, a poly (tetrafluoroethylene) resin film with release properties throughout, and adhesive face 16 on which is located layer 18 of adhesive. Also illustrated in the embodiment of FIG. 1 are optional, non-critical, but preferred elements, reverse printed indicia 8, direct printed indicia 12, composite paper or polymeric interlayers 13, bonded to resin film 6 through laminating adhesive layer 10, and features such as flame, chemical-, or corona-treated surface(s) 14 for enhancing adhesive bonding to the fluoropolymer film, and throw-away release liner 20.

Figure 2:
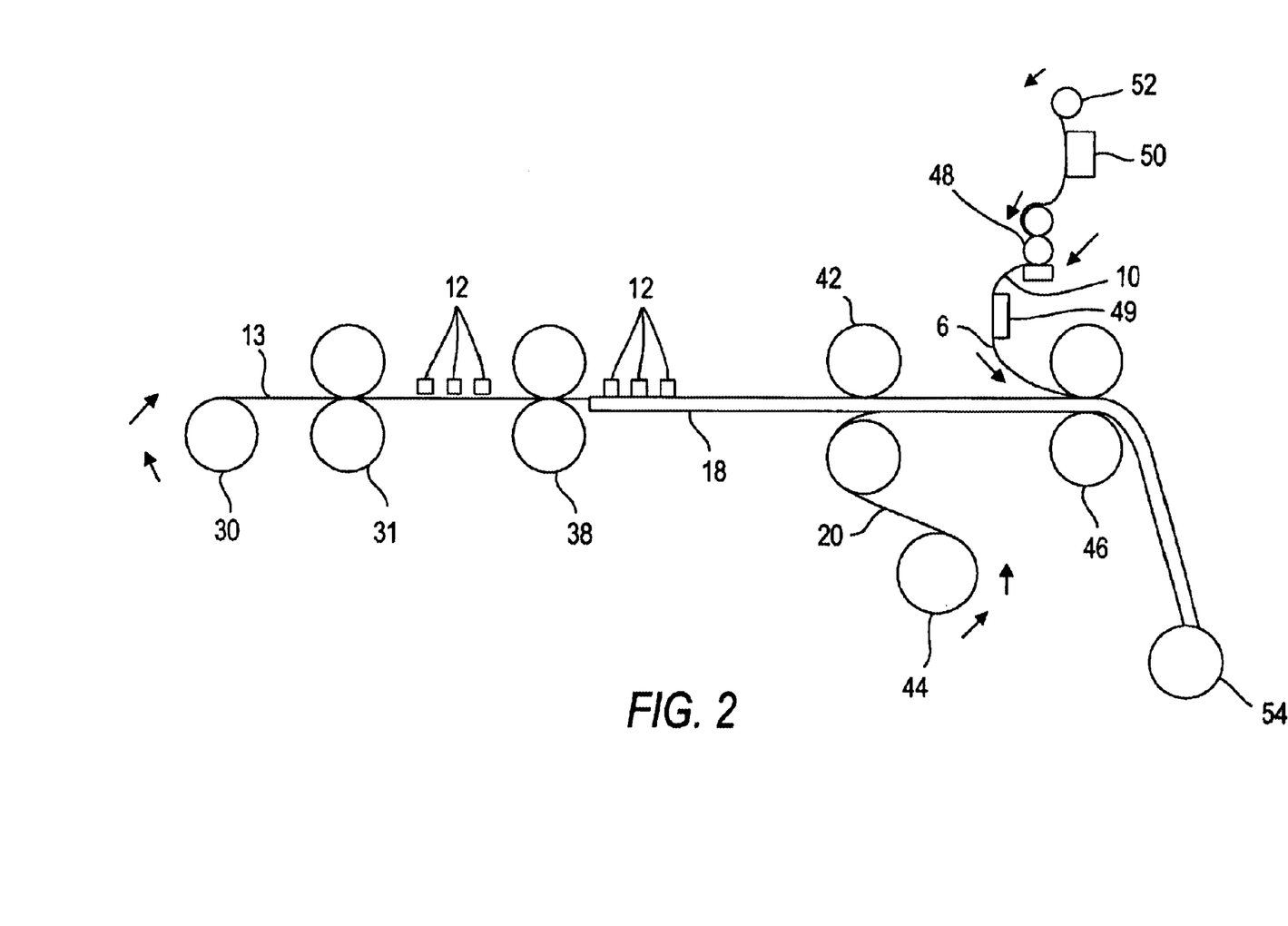
FIG. 2 is a flow diagram of a process employed to make sheets or rolls from which to die-cut support structures according to the first embodiment (FIG. 1) of the present invention.

Referring to FIG. 2, one preferred process to make a laminated support structure of the invention is illustrated in flow diagram form. Plastic film, e.g., oriented polypropylene or polyethylene terephthalate 13 is supplied by roll 30 and is printed at station 31 with indicia, e.g., "LABEL HERE" 12 on its top side. At station 38 pressure-sensitive adhesive 18 is applied to the bottom side, and after proceeding to station 42, the laminate emerges from the station covered with a protective layer of release paper 20 supplied by paper roll 44. Next, the web proceeds to lamination station 46 wherein there is provided a top layer of a release film 6 not having been made by coating with a release layer. In this case a poly(tetrafluoroethylene) film, 0.0005 inch thick, is supplied from roll 52, passed through corona-treater 50, and picks up a coating of laminating adhesive 10 at station 48, passing through a web turner 49, before adhering to the top side of the web entering laminating station 46. At the end of the line the support structure is wound up on roll 54.

Figure 3:
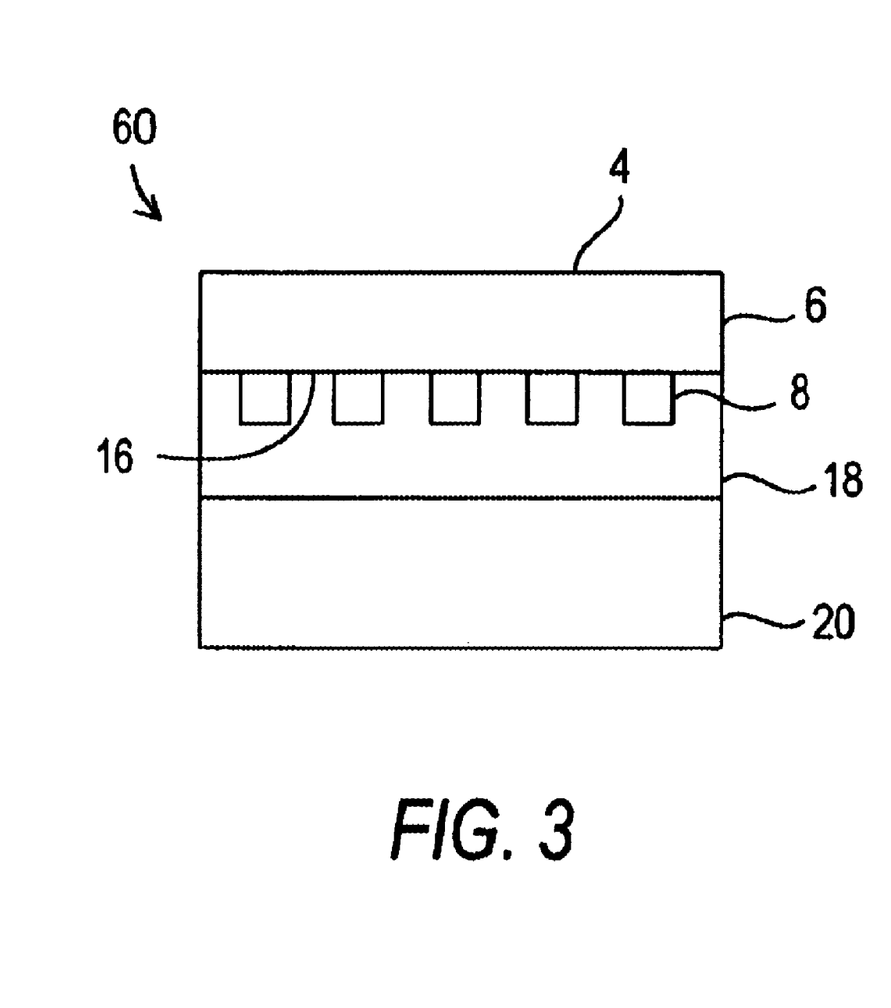
FIG. 3 is a block diagram view of a second support structure constructed in accordance with the present invention.

Referring to FIG. 3, another preferred support structure of this invention comprising a multi-layer laminate 60 is shown. The laminate 60 includes a support structure comprising, as essential elements 4, 6, 16, and 18, which are, reading from the top down: release face 4, made without the use of a coating of release substance, comprising resin film 6, for example, a poly(tetrafluoroethylene) resin film with release properties throughout, and adhesive face 16 on which is located layer 18 of adhesive. Also illustrated in the embodiment of FIG. 3 are optional, non-critical, but preferred elements, reverse printed indicia 8, optionally included composite paper or polymeric interlayers (not shown), bonded to resin film 6 through a laminating adhesive layer (not shown), and features such as flame, chemical-, or corona-treated surface(s) for enhancing printing (not shown), and throw-away release liner 20.

Figure 4:
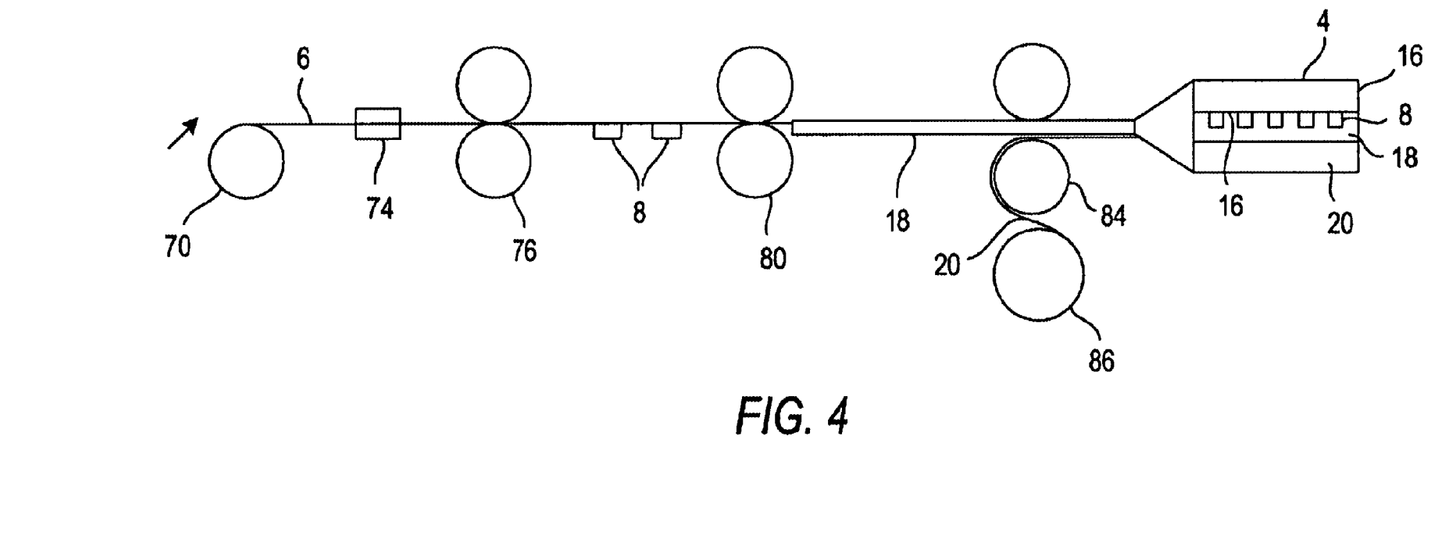
FIG. 4 is a flow diagram of a process employed to make sheets or rolls from which to die-cut support structures according to the second embodiment (FIG. 3) of the present invention.

Referring to FIG. 4, one preferred process to make a laminated support structures of FIG. 3. of the invention is illustrated in flow diagram form. Plastic film, e.g., poly (tetrafluoroethylene) film 6 is supplied by roll 70 and moves through corona treater 74 and then to print station 76 wherein it is provided with indicia, e.g., "LABEL HERE" 8 on its bottom side. At station 80 pressure-sensitive adhesive 18 is applied to the bottom side of the indicia-printed web, and after proceeding to release paper- or film-application station 84, the laminate according to the present invention (shown partially exploded and enlarged for clarity of illustration) emerges from the station covered with a protective layer of release paper or film 20 supplied by paper roll 86. The laminated support structure can be wound up in large rolls (not shown).

Further processing is usually carried out by the end-user in ways well known to those skilled in this art. For example, large rolls can be slit into smaller rolls, and the smaller rolls can be fed to die-cutting machines and/or to fan-folders to produce sheets or detachable forms of suitable size for labeling and re-labeling.

Figure 5:
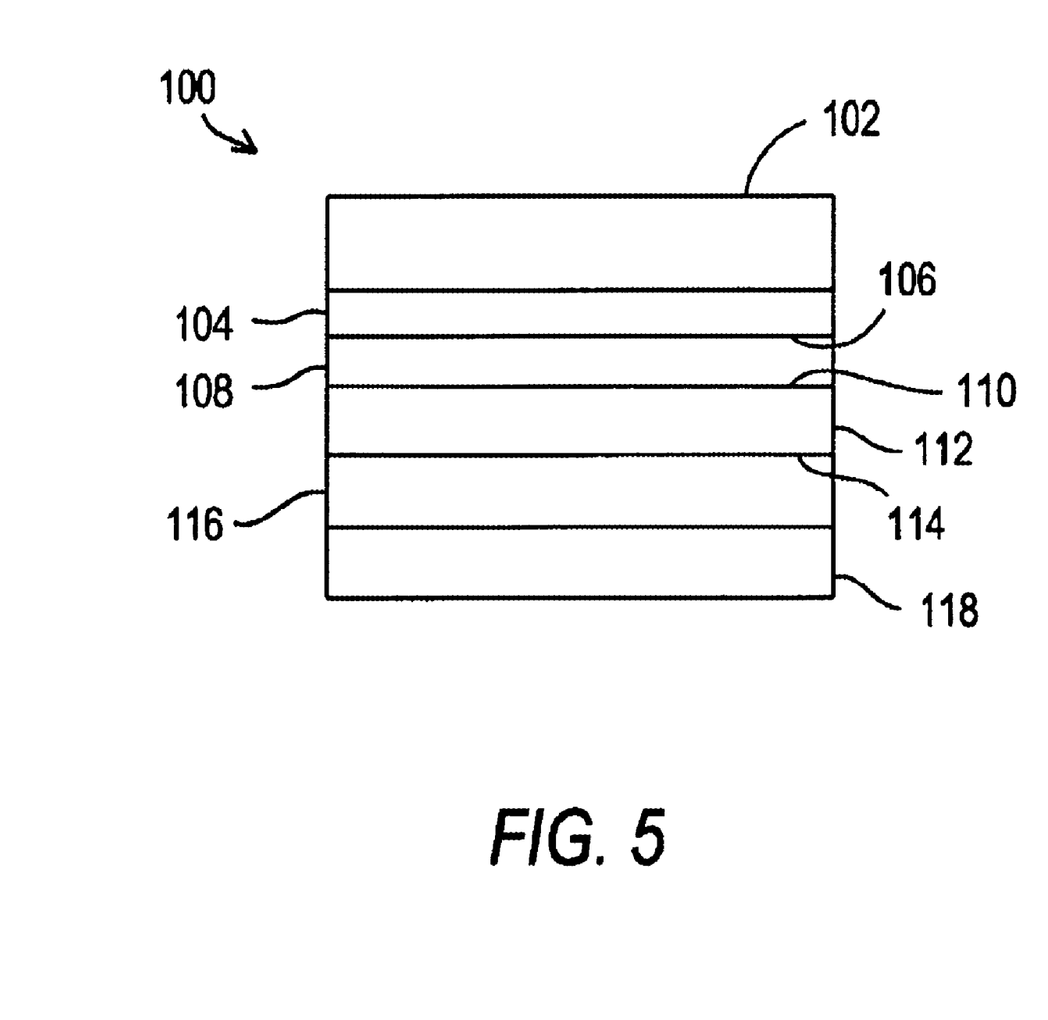
FIG. 5 is a block diagram of a support structure constructed in accordance with the prior art.

The prior art support structure ("placard") is shown in FIG. 5. Reading from the top down placard 100 comprises release coating 102 e.g., a silicone coating, on top of clear film 104 which optionally can be reverse-printed with indicia 106. Next there is provided a layer of adhesive 108, optional directly printed indicia layer 110 then a white film 112 then layer of reverse-printed indicia 114. Next there is provided layer 116 of pressure sensitive adhesive and finally paper release layer 118.

Referring again to FIG. 5, the method for relabeling taught by the prior art comprises: first, removing the release-coated liner 118 from the lamination to provide a placard. The placard 100 is applied to a container such that the adhesive 116 secures the stripped placard (i.e., 102, 104, 116 and 118) firmly to the container (not shown) with the release coating 102 outermost and the printing 114 clearly visible. Then a label (not shown), having an exposed adhesive layer, is applied to the placard such that the label's adhesive contacts the release coating 102. The label carries printed indicia relating to the container and/or its contents. When desired, such as when the container is refilled, the label is removed and a new label (not shown) carrying new information is applied to the placard.

The placard allows pressure-sensitive labels to be easily removed and replaced as many times as necessary. The labels can be removed without ripping or tearing. The labels are not covered by a plastic envelope which results in better bar code scanning. In addition, the container stays free of label and adhesive build-up. Moreover, because of the release surfaces made without coating with release substances any commercially available label can be used including those with inexpensive permanent pressure sensitive adhesive coatings rather than more expensive removable coatings.

The following examples illustrate the present invention and compare it with the prior art. They are not to be construed to limit the claims in any manner whatsoever.

EXAMPLE 1

The following procedure is used to make a first embodiment of this invention as generally set forth in FIG. 1:

1—A base film substrate of 4 mil white High Density Polyethylene from Blako Industries was corona treated on both sides to a minimum 42 dyne surface tension.
2—To one side was applied pressure sensitive adhesive Covinax 377-02 from Franklin International using a #20 laboratory metering rod. The adhesive was dried using a conventional laboratory oven and yielded a dry deposit approximately 1.1 mil of dry pressure sensitive adhesive.
3—A 40# silicone coated Super Calendared Kraft (bleached) from Siltech with L7 release level was laminated to the tacky pressure sensitive adhesive as a protective releasable backing sheet.
4—A sheet of DuPont PFA grade 50 gauge fluoropolymer resin film was corona treated on one side to enhance the surface for bonding.
5—Urethane resin laminating adhesive PD384-30 available from Process Resources Corp with 3 parts of Polyfunctional Aziridine crosslinking agent was applied to the corona treated surface of the PFA resin release film from step #4 using a #10 laboratory metering rod. The coating was dried in a conventional laboratory oven and the coated surface was then pressure laminated through the nip point of a laminating roll to the surface of the exposed corona treated High Density Polyethylene surface of the structure made in step #3. The lamination was allowed to cure for complete bonding of the surfaces.

EXAMPLE 2

The following procedure is used to make a second embodiment of this invention as generally set forth in FIG. 3:
1—A base film substrate of white Oriented Polypropylene known as IML2 from Applied Extrusion Technologies was corona treated on both sides to a minimum 42 dyne surface tension.
2—To the non print side as specified by the manufacturer was applied pressure sensitive adhesive Covinax 377-02 from Franklin International using a #20 laboratory metering rod. The adhesive was dried using a conventional laboratory oven and yielded a dry deposit approximately 1.1 mil of dry pressure sensitive adhesive.
3—A 40# silicone coated Super Calendared Kraft (bleached) from Siltech with L7 release level was laminated to the tacky pressure sensitive adhesive as a protective releasable backing sheet.
4—A sheet of DuPont PFA grade 100 gauge fluoropolymer resin film was corona treated on one side to enhance the surface for bonding.
5—Indicia was applied to the exposed print surface of the oriented polypropylene film in the structure from step #3 using a permanent marker to simulate printed indicia.
6—Pressure sensitive laminating adhesive PD252 available from Process Resources Corp was applied to the corona treated surface of the print surface with simulated indicia from step#5 using a #12 laboratory metering rod. The coating was dried in a conventional laboratory oven and the coated surface was then pressure laminated through the nip point of a laminating roll to the corona treated surface of the PFA resin film made in step #4. The lamination was allowed to set up and build adhesion for optimum bonding of the surfaces.

COMPARATIVE EXAMPLE A

The following procedure is used to make an embodiment of the prior art as generally set forth in FIG. 5:
Actual Placards with patent markings U.S. Pat. Nos. 5,417,790 and 5,628,858 were used for comparative purposes. The structure appears to be from top down:
Silicone coated clear oriented polypropylene
Permanent laminating adhesive
Indicia "Apply Shipping Labels On This Area Only"
White Oriented Polypropylene
Pressure Sensitive Adhesive
Removable silicone coated backing The following test methods are used to compare the respective laminates of Examples 1 and 2 with the placard of Comparative Example A of the prior art:

Paper based pressure sensitive labels supplied by United Parcel Service that are applied for tracking purposes were used for test purposes and are representative of the types of temporary short life cycle labels used for bar coding and other means of identification.

Each example and the control were tested for peel adhesion of the labels 1 hour after label application using a conventional peel tester at 180 degree peel angle.

Chemical Resistance Test

Each example and the control were applied with cleaning solution Ultra Mr. Clean available from Proctor & Gamble in an area wider than the width of the label to be applied. The cleaning solution for household cleaning should be representative and probably even less aggressive than industrial cleaning solutions used to clean bins, tote containers and the like in industrial environments. After 1 hour, the cleaning solution was wiped off with a cotton rag until all residue was removed. It was noticed that the silicone coated surface of the current art placard was marred and had visually changed in the area of contact with the detergent.

Industrial Durability Test

A sample of each of the examples and the control was affixed to a plastic reusable industrial tote container manufactured by Schultz typically used for transporting shipments of chemicals or other ingredients which are then shipped back and cleaned before reuse. Every time it is used a new label is applied so this is a practical test for testing. A high pressure washer from Land Model OHW40021B used in practice to clean residue from the inside and outside of reusable containers with high pressure water set at 150 degrees F. in this case was used. Each of the example placards and the control were exposed to 30 seconds of "washing" then the placards were removed and dried before the test labels were applied in the washed area.

Abrasion Test

A sample of each of the examples and the control was tested for abrasion resistance using "Emery Fine Resin Bond Cloth." Each specimen was rubbed 10 strokes by hand to abrade the surface to simulate abrasion of the surface in repeated handling and use. Labels were than applied to the abraded area. Peel tests on the peel tester described earlier were performed using the test labels on the samples and control at 1 hour and 24 hour label dwell times. Peel measurement strength range is measured in grams. The range of peel was estimated from the lowest reading to the highest with +/−20 grams a reasonable measurement error.

The results of testing are set forth in Table 1:

TABLE 1

| SAMPLE | AS MADE OR SUPPLIED 1/24 hour dwell | CHEMICAL RESISTANCE 1/24 hour Dwell | DURABILITY 1/24 hour Dwell | ABRASION RESISTANCE 1/24 hour Dwell |
|---|---|---|---|---|
| CONTROL | 30–75/ 40–90 | 30–500/ Label Destruct | 50–500/ 70–500 Very Spotty | 45–270/ 50–350 Very Spotty |
| Example #1 | 40–90/ 60–115 | 40–85/ 60–150 | –80/ 60–130 | 50–75/ 55–130 |
| Example #2 | 40–90/ 65–100 | 35–80/ 65–140 | 30–75/ 70–140 | 40–70/ 60–120 |

The test data are evidence of the enhanced durability achieved in accordance with the invention defined by the claims herein.

The patents, applications, publications and test methods mentioned above are incorporated herein by reference.

Many variations of the present invention will suggest themselves to those skilled in the art in light of the above detailed description.

All such obvious modifications are within the full intended scope of the appended claims.

What is claimed is:

1. A durable self-adhesive laminate in roll, sheet or fan-fold form for use as a support for labeling and re-labeling of objects such as containers, said laminate comprising:
   (a) a thermoplastic resin film which comprises a polytetrafluoroethylene film having (A) a label-receiving side and (b) an adhesive side, said label-receiving side consisting of a controlled-release surface without making use of a coated release substance and adapted to support a removable label attachable thereto by means comprising attraction forces between the thermoplastic resin film and said label;
   (b) an adhesive having an ultimate release energy level greater than the attraction forces between the resin film and a removable label or labels, said adhesive being situated on the adhesive side of said thermoplastic resin film;
   (c) a temporary backing in contact with the adhesive, said backing being adapted subsequently to be stripped from contact with the adhesive,
   (d) removable pressure-sensitive-adhesive-backed label or labels adhered to the label-side of the resin film,
whereby the support is suitable for mounting on an object to be labeled or re-labeled, after first having stripped said temporary backing therefrom, and any label or labels may, at the option of the user, be affixed to the label-receiving side and later separated from the resin film at a release force that effectuates such separation, without, at the same time, stripping the resin film from the object to be labeled or re-labeled.

2. The laminate as defined in claim 1 wherein the release force between the label or labels and the resin film having the controlled-release surface without making use of a coated release substance is about 5 to about 100 grams per inch width, and the adhesion energy level of the adhesive is greater than the release force between the label or labels and the resin film having the controlled-release surface without making use of a coated release substance.

3. The laminate as defined in claim 2 wherein the release force between the label or labels and the resin film having the controlled-release surface without making use of a coated release substance is about 20 to about 60 grams per inch width.

4. The laminate as defined in claim 1 wherein the label or labels comprise paper or a polymer film.

5. The laminate as defined in claim 1 wherein the resin film (a) is a composite of resin layers, the composite having (i) a label-receiving side comprising poly (tetrafluoroethylene) and (ii) an adhesive side comprising polyethylene, polypropylene, poly(vinyl chloride), polyester, polyurethane, polyacrylate, polycarbonate, polyamide, polystyrene, fluoropolymer or a blend comprising any of the foregoing.

6. A process for the preparation of a durable self-adhesive laminate in roll, sheet or fan-fold form for use as a support for labeling and re-labeling of objects such as containers, said process comprising:
   (1) providing a thermoplastic resin film which comprises a polytetrafluoroethylene film having (i) a label-receiving side and (ii) an adhesive side, said label-receiving side consisting of a controlled-release surface without making use of a coated release substance and adapted to support a removable label attachable thereto by means comprising attraction forces between the resin film and said label substrate;
   (2) locating on the adhesive side of said resin film an adhesive having an ultimate release energy level greater than the attraction forces between the resin film and a removable label or labels;
   (3) providing a temporary backing in contact with the adhesive, said backing being adapted subsequently to be stripped from contact with the adhesive,
   (4) removable pressure-sensitive-adhesive-backed label or labels adhered to the label-side of the resin film,
thereby providing a support suitable for mounting on an object to be labeled or re-labeled, after first stripping said temporary backing therefrom, and affixing any label or labels, at the option of the user, to the label-receiving side and later separating from the resin film at a release force effecting such separation, without, at the same time, stripping the resin film from the object to be labeled or re-labeled.

7. The laminate as defined in claim 6 wherein the release force between the label or labels and the resin film having the controlled-release surface without making use of a release substance is about 5 to about 100 grams per inch width, and the adhesion energy level of the adhesive is greater than the release force between the label or labels and the resin film having the controlled-release surface without making use of a coated release substance.

8. The process as defined in claim 7 wherein the release force between the label or labels and the resin film having the controlled-release surface without making use of a coated release substance is about 20 to about 60 grams per inch width.

9. The process as defined in claim 6 wherein the label or labels comprise paper or a polymer film.

10. The process as defined in claim 6 wherein the resin film (a) is a composite of resin layers, the composite having (i) a label-receiving side comprising poly(tetrafluoroethylene) and (ii) an adhesive side comprising polyethylene, polypropylene, poly(vinyl chloride), polyester, polyurethane, polyacrylate, polycarbonate, polyamide, polystyrene, fluoropolymer or a blend comprising any of the foregoing.

11. A method of labeling or re-labeling an object comprising:
- a) providing a laminated support structure for pressure-sensitive adhesive-backed labels, said support structure consisting essentially of a polytetrafluoroethylene film having (A) a label-receiving side and (B) an adhesive side, said label-receiving side consisting of a controlled-release surface without making use of a coated release substance and adapted to support a removable label attachable thereto by means comprising attraction forces between the resin film and said label substrate having a release coated face and an adhesive coated face, and a liner covering said adhesive coating;
- b) removing said liner from said adhesive coated face;
- c) substantially permanently attaching the support structure to the object by adhering said laminated support structure to said object using said adhesive coated face; and
- d) placing a pressure-sensitive adhesive coated label on said label-receiving side consisting of said controlled-release surface without making use of a coated release substance of said support structure.

12. A method as defined in claim 11, including the step comprising:
- e) removing said label from the support structure while leaving the support structure adhered to the object.

13. A process as defined in claim 12, including the step comprising
- f) replacing said label with another adhesive coated label having different indicia printed thereon by adhering the adhesive coating of said another label to the said label-receiving side consisting of said controlled-release surface without making use of a coated release substance of said support structure.

14. The process of claim 11 wherein the object is a product container.

* * * * *